United States Patent [19]

Winand et al.

[11] Patent Number: 4,769,226

[45] Date of Patent: Sep. 6, 1988

[54] PURIFICATION OF WET-PROCESS PHOSPHORIC ACID

[75] Inventors: Louis Winand, Bourg Achard; Dominique Perron, Grand Couronnes par Moulineaux, both of France

[73] Assignee: Rhone-Poulenc Chimie de Base, Courbevoie, France

[21] Appl. No.: 98,702

[22] Filed: Sep. 18, 1987

Related U.S. Application Data

[63] Continuation of Ser. No. 936,571, Nov. 20, 1984, abandoned, which is a continuation of Ser. No. 459,676, Jan. 20, 1983, abandoned.

[30] Foreign Application Priority Data

Jan. 25, 1982 [FR] France .................................. 82 01058

[51] Int. Cl.$^4$ ..................... C01B 25/22; C01B 25/234; C01B 25/46
[52] U.S. Cl. ............................. 423/321 S; 423/321 R; 210/638
[58] Field of Search ............ 423/54, 55, 321 R, 321 S; 210/634, 638

[56] References Cited

U.S. PATENT DOCUMENTS

| | | | |
|---|---|---|---|
| 1,538,089 | 5/1925 | Carothers | 423/321 R |
| 1,601,208 | 9/1926 | Gerber | 423/321 R |
| 1,787,192 | 12/1930 | Fiske | 423/321 R |
| 1,951,077 | 3/1934 | Woodstock | 423/321 R |
| 2,003,051 | 5/1935 | Knox | 423/321 R |
| 2,044,940 | 6/1936 | Haag | 423/321 R |
| 3,367,749 | 2/1968 | Koerner | 423/321 S |
| 3,410,656 | 11/1968 | Bunin et al. | 423/321 S |
| 3,993,735 | 11/1976 | Irani | 423/321 S |
| 4,070,443 | 1/1978 | Kikuchi | 423/321 S |
| 4,330,516 | 5/1982 | Winand | 423/321 S |
| 4,378,340 | 3/1983 | Berglund | 423/321 R |

FOREIGN PATENT DOCUMENTS

| | | | |
|---|---|---|---|
| 0023195 | 1/1981 | European Pat. Off. | 423/321 S |
| 1531487 | 5/1968 | France | 423/321 S |
| 2234228 | 6/1974 | France | 423/321 S |

OTHER PUBLICATIONS

"Chemical Abstracts", vol. 84, No. 18, May 3, 1976, p. 130, 124043v.
"Chemical Abstracts", vol. 96, No. 6, Feb. 8, 1982, p. 156, 37774p.

*Primary Examiner*—Ernest G. Therkorn
*Attorney, Agent, or Firm*—Burns, Doane, Swecker & Mathis

[57] ABSTRACT

Crude wet-process phosphoric acid is purified by treating a dilute such acid with a molybdenum value reducing amount of hydrogen sulfide or of a sulfide which in situ forms hydrogen sulfide, to afford a purified acid adopted for the production of food grade phosphoric acid, and which has a content in heavy metal and molybdenum values of less than 10 ppm.

10 Claims, No Drawings

{ 4,769,226 }

PURIFICATION OF WET-PROCESS PHOSPHORIC ACID

This application is a continuation of application Ser. No. 936,571 filed Nov. 20, 1984, which in turn is a continuation of application Ser. No. 459,676 filed Jan. 20, 1983, both now abandoned.

BACKGROUND OF THE INVENTION

1. Field of the Invention

The present invention relates to the purification of crude wet-process phosphoric acid by removal of contaminating amounts of heavy metal values therefrom, notably molybdenum values, and, more especially, relates to the preparation of food grade phosphoric acid utilizing such purification.

2. Description of the Prior Art

Phosphoric acid is of course widely used in a great number of food and beverage products, and the demand therefor is constantly increasing. Furthermore, the phosphoric acid used in the food industry was until recently that acid prepared by thermal process. Such acid is known to contain only very small quantities of impurities, particularly as regards impurities which would adversely detract from food and beverage products.

Thermal processing is, however, quite expensive. Thus, the art has looked to the use of wet-process phosphoric acid for foodstuff applications, which is much cheaper to manufacture.

Unfortunately, wet-process phosphoric acid contains many impurities and particularly metallic elements such as lead, mercury and arsenic, which make it impossible to use such acid in the food industry without having subjected same to upstream purification.

Food grade acids must indeed be manufactured in accordance with very specific and strict standards, governmental and otherwise. In particular, commercial food grade acids, namely, those theoretically containing 75 to 85% of $H_2PO_4$, or approximately 54 to 62% of $P_2O_5$, are necessarily subjected to the "heavy metal test".

The purpose of such test is to determine the heavy metal content of the acids. The best known of the heavy metals include, particularly, silver, mercury, lead, copper, cadmium and bismuth.

The test consists of determining the color of a sample of phosphoric acid when treated with $H_2S$ at a specific pH value (between 3 and 4). The resulting color is next compared with those of control solutions containing known amounts of $Pb^{2+}$ and the results are extrapolated into heavy metals expressed as lead. Also, for the test to be significant, it has to be conducted upon those acids which have, during the manufacture thereof, been subjected to treatment with $H_2S$ or a sulfide in a highly acid medium (neat acid), such that the arsenic sulfide is precipitated and can then be filtered off. Without the immediately aforesaid, the arsenic sulfide would impart a yellow tint, which would falsify the results of the test. The aforesaid removal of arsenic values is carried out to such extent that commercial strength acid results.

For food grade acids and acids at commercial strength, as aforesaid, the amount of contaminating metal values therein must be less than 10 ppm.

Now, in the case of most wet-process phosphoric acids, even after the known purifications, and especially those entailing liquid/liquid extraction with an organic solvent and the contacting with hydrogen sulfide at commercial strength, it is impossible to develop a heavy metal test which will comply with the foregoing standard.

It has now been determined by applicants, however, that the fact that the noted test produced a value of over approximately 10 ppm is essentially due to the molybdenum, which is present in substantial quantities in most wet-process phosphoric acids, and particularly even in those purified by treatment with an organic solvent. The action of $H_2S$ on molybdenum salts indeed produces a yellow color, with the result that the test Will not comply with the standard.

SUMMARY OF THE INVENTION

Accordingly, a major object of the present invention is the provision of an improved process for the purification of crude phosphoric acids, which improved process enabling reduction in the amount of heavy metal contaminants/impurities therein, notably molybdenum values, preferably to a level of less than 10 ppm.

Briefly, the purification according to this invention features treating a dilute, crude phosphoric acid with a sulfide, or with hydrogen sulfide.

DETAILED DESCRIPTION OF THE INVENTION

More particularly according to this invention, in one specific embodiment thereof, the dilute phosphoric acid starting material is preliminarily liquid/liquid extracted with an organic solvent, and thence is back-extracted, prior to the treatment with a sulfide or with hydrogen sulfide.

Nonetheless, a critical feature of the invention is that the acid treated must be a dilute acid.

The crude acid starting material is a wet-process phosphoric acid obtained by the acidulation with a strong acid, such as sulfuric, nitric or hydrochloric acid, of a phosphate ore. The ore may of course have first been subjected to any known preliminary treatment, such as calcination, grinding or a flotation process. Furthermore, by "dilute acid" there is intended an acid having a concentration below or well below the commercial concentration indicated above, which is on the order of about 54 to 62% of $P_2O_5$.

The maximum concentration at which the method of the invention can validly be carried out depends upon the ore used initially to manufacture the phosphoric acid, and more particularly on the molybdenum content of the ore and of the resultant acid. The smaller the molybdenum content of the acid before treatment, the higher the maximum concentration will be, and vice versa. The maximum concentration, expressed in $P_2O_5$, typically must not be greater than about 40% of $P_2O_5$.

The minimum concentration is not critical. It is essentially determined by economic considerations. It will be appreciated that the lower the concentration and the more disadvantageous the water balance for the overall process of preparing the phosphoric acid, the more energy will be required to convert the acid back to a commercial strength.

The minimum concentration can consequently be fixed at about 10% of $P_2O_5$. It will be seen that the treatment of the invention is in practice carried out upon an acid which has been purified by extraction with an organic solvent. In this case, the acid is typically at a concentration of about 20 to 30% of $P_2O_5$.

Before being treated with the sulfide or with hydrogen sulfide, the phosphoric acid may first be subjected to preliminary purification. The preliminary purification may be any appropriate technique and may in particular consist of purification by solvents, or, as mentioned above, of liquid/liquid extraction with an organic solvent.

Exemplary of suitable solvents are alcohols, especially aliphatic alcohols and particularly those containing 3 to 8 carbon atoms, such as propanols, butanols and pentanols; phosphoric esters, such as tributylphosphate (TBP), amines, ketones such as methylbutylketone, and ethers such as isopropyl ether, employed either alone or in admixture.

The phosphoric acid contained in the organic phase is back-extracted in the form of an aqueous solution, e.g., by back-extracting with water or by distillation.

In the case of liquid/liquid extraction, this is carried out in known manner. The crude phosphoric acid resulting from the acidulation, e.g. with sulfuric acid, of a phosphate rock or ore, is contacted with an organic solvent countercurrently in an extractor; the solvent has sufficient affinity for phosphoric acid and is immiscible or barely miscible with water.

It will be appreciated that in the preliminary treatment immediately above-indicated, consisting of extraction with an organic solvent, the choice of solvent does not appear to be critical. The molybdenum may be thought to be complexed by the phosphoric acid, such that the solvent extracts the molybdenum with the phosphoric acid, and this is confirmed by the fact that the molybdenum content of the acid thus pretreated is very close to that of the crude acid.

The treatment proper according to the invention is effected by contacting the acid with hydrogen sulfide, by adding hydrogen sulfide to the acid or by incorporating therein a sulfide adapted to give off hydrogen sulfide in the acid.

Exemplary of sulfides suitable for use according to the invention are sulfides or hydrogen sulfides of alkali metals, alkaline earth metals or ammonia, such as sodium sulfide, potassium sulfide, ammonium sulfide, barium sulfide, calcium sulfide, sodium hydrogen sulfide, ammonium hydrogen sulfide, and similar such compounds.

The sulfide is selected with the realization that the acid must not be recontaminated by adding a troublesome cation thereto. For example, if an acid containing no sodium, or only a small amount of sodium, is required, $H_2S$ will be used in place of $Na_2S$.

The temperature at which the treatment is carried out is not critical and is determined by practical conditions. The treatment generally takes place at ambient temperature, i.e., at about 18 to 30° C. In some cases it has been possible to demonstrate a slight improvement in the elimination of molybdenum at approximately 50° C., as compared with treatment at ambient temperature.

The acid may be contacted with the $H_2S$ or the sulfide by any known means.

It has been found advantageous to countercurrently contact the acid with the sulfide solution. The sulfide solution gives off hydrogen sulfide gas upon contact with the acid, particularly in a system with a countercurrent column filled with glass spheres.

The sulfide is advantageously used in excess relative to the equivalent amount of heavy metal and molybdenum present in the phosphoric acid to be purified.

The treatment is carried out such as to provide a molybdenum content preferably of less than 10 ppm relative to $P_2O_5$.

After treatment, the sulfides precipitated are separated from the acid by any known means.

The removal of arsenic is found to remain completely satisfactory, in addition to the marked reduction in molybdenum content.

Upon completion of the treatment, the purified acid is then concentrated to the desired strength.

It too is envisaged to treat the concentrated acid with a view towards removing the yellow color resulting from the presence of a small amount of organic impurities. Such treatment may in particular consist of adding an oxidizing agent such as hydrogen peroxide, while heating the acid, e.g., to 130° C., and then by adding an adsorbent such as active carbon or preferably an oxidizing agent such as $HClO_3$, e.g., at about 160° C.

In order to further illustrate the present invention and the advantages thereof, the following specific examples are given, it being understood that same are intended only as illustrative and in nowise limitative. In said examples, unless otherwise indicated, all percentages and contents are expressed in weight relative to $P_2O_5$. In Examples 1 to 7 which follow is demonstrated the effect of the strength of the acid on the removal of the molybdenum values.

EXAMPLE 1

The starting material acid was a crude acid obtained by the acidulation of Florida phosphate rock and purified by extraction with tributylphosphate. It then had a $P_2O_5$ content of 25.2%, a molybdenum content of 12 ppm and an arsenic content of 22 ppm.

An $Na_2S$ liquor having a concentration of 150 g/l was dripped into the acid. The liquor was added for about one-half hour in an agitated Erlenmeyer flask. The quantity of $Na_2S$ liquor added corresponded to 2 g of Na2S per liter of acid.

The resulting matetial was then filtered through a No. 4 filtering crucible.

The arsenic content and the molybdenum content of the treated and filtered acid were then noted.

The results are reported in Table I.

EXAMPLES 2 to 4

The starting material acid was the same as in Example 1, but with varying concentrations of $P_2O_5$.

The procedure followed was the same as in Example 1, and the arsenic content and molybdenum content obtained are those reported in Table I.

EXAMPLES 5 to 7

In these examples, the starting material acid was prepared by acidulation of Jordanian phosphate rock and purified by extraction with tributyl phosphate. The acid had a molybdenum content of 67 ppm and an arsenic content of 8 ppm.

The procedure followed was the same as in Example 1, with varying concentrations of $P_2O_5$. The results are reported in Table I.

From the foregoing examples, it will be appreciated that satisfactory elimination of molybdenum, namely, to a value below 10 ppm, cannot be obtained from a certain concentration of $P_2O_5$ and any increase therein.

The examples which follow illustrate the influence of the molybdenum content of an acid purified by the heavy metal test.

The amount of Na$_2$S liquor employed was also varied.

EXAMPLE 8

A crude acid containing 12 ppm of Mo/P$_2$O$_5$ was used, obtained by acidulation of Florida phosphate rock and purified by extraction with tributylphosphate. It then had a concentration of 25.5% of P$_2$O$_5$. The acid was treated with Na$_2$S liquor (2 g Na$_2$S/l); the resultant material was filtered and concentrated to a P$_2$O$_5$ content of 61%.

The color was removed from the acid thus concentrated, by treating it with a small quantity of hydrogen peroxide at about 130° C. and then with a small quantity of active carbon, or preferably with a small quantity of HClO$_3$ at about 160° C., in order to eliminate the yellow color due to a small amount of organic impurities.

The acid was then subjected to the heavy metal test. The result is reported in Table II.

EXAMPLE 9

The procedure followed was the same as in Example 8, but the Na$_2$S treatment was applied to the acid concentrated to 61% of P$_2$O$_5$. In case (a), this was carried out by adding 2 g of Na$_2$S in liquor form per liter of acid, while in case (b) the quantity of Na$_2$S was multiplied by five.

The results are also reported in Table II.

EXAMPLES 10 and 11

The procedure followed was the same as in Example 8, but the starting material was an acid containing 67 ppm of Mo/P$_2$O$_5$. The acid had been obtained by acidulation of Jordanian phosphate rock, which had also been purified by extraction with TBP and treated with Na$_2$S at different concentrations of P$_2$O$_5$.

The results are also reported in Table II.

EXAMPLES 12 and 13

The starting material was a crude acid containing 19 ppm of Mo/P$_2$O$_5$. This had been obtained by acidulation of North Carolina phosphate rock which had been calcined and purified by extraction with TBP. The procedure followed was the same as in Example 8; the concentration of acid for the Na$_2$S treatment was varied, and the quantity of Na$_2$S liquor used was also varied.

The results are also reported in Table II.

EXAMPLE 14

In order to demonstrate the effect of molybdenum on the heavy metal test, the test was carried out upon a thermal process acid. This contained less than 1 ppm of arsenic, had a P$_2$O$_5$ concentration of 62% and had been doped with various quantities of molybdenum.

The results too are reported in Table II.

EXAMPLES 15 to 18

The starting material was crude acids containing 78 ppm Mo/P$_2$O$_5$. These were obtained from a calcined ore from Youssoufia and purified by extraction with tributylphosphate. Same were treated, as before, with a solution of Na$_2$S which is dripped into them in an Erlenmeyer flask (Examples 15 to 17).

By way of comparison (Example 18), an experiment was carried out countercurrently in a column 2 cm$^2$ in cross section, which was filled with glass spheres to a height of 60 cms (empty volume: 65 ml). The flow rate of acid was 140 ml/h; that of the 20 g/l solution of Na$_2$S was 14 ml/hr, corresponding to 1.9 g of Na$_2$S/l of acid.

The results are reported in Table III, which demonstrate the importance of conducting the operation countercurrently, since a higher degree of purity was obtained with a far lower consumption of Na$_2$S.

The purpose of the following examples is to evidence that the treatment according to the invention can also significantly reduce the amount of other heavy metals, such as copper and lead, contained in phosphoric acid.

EXAMPLE 19

A crude acid obtained from a calcined ore from North Carolina was used. Same had been purified by extraction with TBP and contained 29.6% P$_2$O$_5$ and, in ppm/P$_2$O$_5$: 0.24 Cu; Pb <1.

Same was replenished with lead nitrate to provide 2 ppm Pb/P$_2$O$_5$. The acid was treated with a 150 g/l solution of Na$_2$S which was distributed drop-by-drop over the course of one-half hour at the rate of 2 g of Na$_2$S/l of acid, then filtered through a filtering crucible of No. 4 porosity.

Analysis evidenced a content of: 29% P$_2$O$_5$ and, in ppm/P$_2$O$_5$: 0.18 Cu; 1.0 Pb.

EXAMPLE 20

A crude acid obtained by acidulation of Florida phosphate rock was used, containing 27% P$_2$O$_5$ and, in ppm/P$_2$O$_5$: 0.23 Cu; Pb<1. Same was replenished with lead nitrate and copper nitrate to provide a content of 1.1 ppm Pb/P$_2$O$_5$ and 0.70 ppm Cu/P$_2$O$_5$.

The same treatment as in Example 19 was carried out, and analysis of the filtered acid evidenced a content of: 26.3% P$_2$O$_5$ and, in ppm/P$_2$O$_5$: 0.15 Cu; 0.70 Pb.

TABLE I

| EXAMPLE | CONCENTRATION % P$_2$O$_5$ | CONTENT OF Mo, ppm/P$_2$O$_5$ | CONTENT OF As, ppm/P$_2$O$_5$ |
|---|---|---|---|
| 1 | 25.2 | 3.7 | <0.2 |
| 2 | 37.2 | 7.6 | — |
| 3 | 48.1 | 10.4 | — |
| 4 | 58 | 11.6 | <0.2 |
| 5 | 25.5 | 6.5 | <0.2 |
| 6 | 31.8 | 13.2 | <0.2 |
| 7 | 56.3 | 27.4 | <0.2 |

TABLE II

| EXAMPLE | CONCENTRATION % P$_2$O$_5$ IN ACID TREATED BY Na$_2$S | QUANTITY OF Na$_2$S USED (g/liter OF ACID) | CONTENT OF Mo, ppm/P$_2$O$_5$ | HEAVY METAL TEST EXPRESSED AS Pb ON ACIDS CONTAINING 61% OF P$_2$O$_5$ |
|---|---|---|---|---|
| 8 | 25.5 | 2 | 3.7 | 3 |
| 9 | 61 | (a) 2 | 12 | >10 |
|   |    | (b) 10 | 12 | >10 |
| 10 | 29.5 | 2 | 10 | Approx. 10 |
| 11 | 25.5 | 2 | 6.5 | Approx. 8 |

TABLE II-continued

| EXAMPLE | CONCENTRATION % $P_2O_5$ IN ACID TREATED BY $Na_2S$ | QUANTITY OF $Na_2S$ USED (g/liter OF ACID) | CONTENT OF Mo, ppm/$P_2O_5$ | HEAVY METAL TEST EXPRESSED AS Pb ON ACIDS CONTAINING 61% OF $P_2O_5$ |
|---|---|---|---|---|
| 12 | 29 | 2 | 4 | Between 3 & 10 |
| 13 | 61 | (a) 2 | 19 | >10 |
|  |  | (b) 22 | 18.5 | >10 |
| 14 | 62 |  | 0.3 | <3 |
|  |  |  | 4 | Between 3 & 10 |
|  |  |  | 9 | Approx. 10 |
|  |  |  | 13 | >10 |

TABLE III

| EXAMPLE | CONCENTRATION As, % $P_2O_5$ IN ACID TREATED | QUANTITY OF $Na_2S$ USED (g/l of ACID) | CONTENT OF Mo, ppm/$P_2O_5$ |
|---|---|---|---|
| 15 | 26.2 | 6 | 29 |
| 16 | 26.2 | 10 | 17 |
| 17 | 22 | 20 | 11.5 |
| 18 | 26.5 | 1.9 | 7 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for purifying a crude wet-process phosphoric acid comprising:
    (a) providing a dilute wet-process phosphoric acid having a concentration in $P_2O_5$ about 40% or less and a molybdenum content which would adversely detract from food and beverage products;
    (b) countercurrently contacting a stream of said dilute wet-process phosphoric acid with hydrogen sulfide or a sulfide which forms hydrogen sulfide upon contact with said dilute wet-process phosphoric acid to reduce said mulybdenum content to about 10 ppm/$P_2O_5$ or less; and
    (c) separating and recovering said food-grade product phosphoric acid.

2. The process as defined by claim 1, said dilute starting material acid having a concentration in $P_2O_5$ of from about 10 to 40%.

3. The process as defined by claim 2, said dilute starting material acid having a concentration in $P_2O_5$ of from about 20 to 30%.

4. The process as defined by claim 1, further comprising preliminarily purifying said dilute starting material acid by liquid/liquid extraction with an organic solvent and then by back-extraction.

5. The process as defined by claim 4, said organic solvent comprising tributylphosphate.

6. The process as defined by claim 1, said treatment comprising countercurrently contacting the dilute starting material acid with a sulfide solution.

7. The process as defined by claim 1, further comprising concentrating the product acid to a concentration in $P_2O_5$ of from about 54 to 62%.

8. The process as defined by claim 7, further comprising decolorizing said concentrated acid.

9. The process as defined by claim 1, further comprising separating from the product acid the sulfides which precipitate.

10. The process as defined by claim 1, comprising employing an excess of sulfide relative to the equivalent amount of heavy metal and molybdenum values present in said dilute starting material acid.

* * * * *